United States Patent
Sando

(10) Patent No.: US 7,191,682 B2
(45) Date of Patent: Mar. 20, 2007

(54) PEDAL SUPPORT STRUCTURE FOR A VEHICLE

(75) Inventor: Masahiro Sando, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 310 days.

(21) Appl. No.: 10/454,386

(22) Filed: Jun. 3, 2003

(65) Prior Publication Data

US 2003/0221512 A1    Dec. 4, 2003

(30) Foreign Application Priority Data

Jun. 4, 2002    (JP)    ............... 2002-162931

(51) Int. Cl.
    *G05G 1/14*    (2006.01)
(52) U.S. Cl. .............. 74/560; 74/512; 180/274
(58) Field of Classification Search ............ 74/512, 74/513, 560, 478; 180/274, 90.6; 188/171, 188/176, 177; 403/2
    See application file for complete search history.

(56) References Cited

U.S. PATENT DOCUMENTS

| 4,746,144 A | * | 5/1988 | Kulczyk ............. 280/777 |
| 5,848,662 A | * | 12/1998 | Sakaue ............. 180/274 |
| 5,970,817 A | * | 10/1999 | Ichiba ............. 74/512 |
| 6,112,616 A | * | 9/2000 | Schonlau et al. ........ 74/512 |
| 6,176,340 B1 | * | 1/2001 | Mizuma et al. ......... 180/274 |
| 6,276,228 B1 | * | 8/2001 | Hoerster ............. 74/512 |
| 6,276,483 B1 | * | 8/2001 | Sinnhuber et al. ....... 180/274 |
| 6,339,971 B1 | * | 1/2002 | Kato ............. 74/512 |
| 6,408,711 B1 | * | 6/2002 | Mizuma et al. ........ 74/512 |
| 6,418,812 B2 | * | 7/2002 | Mizuma et al. ........ 74/512 |
| 6,481,311 B1 | * | 11/2002 | Sanagi et al. ........ 74/512 |
| 6,742,411 B2 | * | 6/2004 | Aoki et al. ............. 74/512 |
| 6,808,040 B2 | * | 10/2004 | Hayashihara et al. ..... 180/315 |

FOREIGN PATENT DOCUMENTS

| DE | 101 28 880 A1 | 12/2002 |
| WO | WO-02/22413 A1 | 3/2002 |
| WO | WO 200222413 A1 * | 3/2002 |

* cited by examiner

Primary Examiner—Thomas R. Hannon
Assistant Examiner—Justin Krause
(74) Attorney, Agent, or Firm—Darby & Darby

(57) ABSTRACT

A support structure for supporting a pedal for a vehicle with a pedal bracket connected to a toeboard panel for separating an engine compartment from a passenger compartment and to a steering beam disposed at a backward position from the toeboard panel. The support structure has a front bracket section of the pedal bracket fixed to the toeboard panel, and a rear bracket section of the pedal bracket fixed to the steering beam through a support bracket for the steering beam, the pedal being attached directly to the rear bracket section, wherein a rear end part of the front bracket section is slidably secured into a front end part of the rear bracket section with coupler.

3 Claims, 2 Drawing Sheets

PEDAL SUPPORT STRUCTURE FOR A VEHICLE

BACKGROUND OF THE INVENTION

The present invention relates to a pedal support structure for a vehicle, more specifically to the support structure for a pedal intended for improving safety in case of a car crash.

The present application claims priority from Japanese Patent Application No. 2002-162931, the disclosure of which is incorporated herein by reference.

Conventionally, such a suspension-type pedal as a brake or clutch pedal is located at a recess below an instrument panel for converting an operational force into a liquid pressure to apply a braking force and to disengage a friction clutch. Such a pedal 1, as shown in FIG. 5, is supported by a car body via a pedal bracket 4. The pedal bracket 4 is fixed to a bulkhead 2 at a top end part of the same pedal bracket 4, and to a toeboard panel 3 at a front end part thereof.

However, with the conventional support structure for the pedal, a car crash might cause the bulkhead 2 and the toeboard panel 3 to deform to intrude into a passenger compartment 5. Thus, the deformation of the bulkhead 2 and the toeboard panel 3 may move the pedal 1 toward the feet of driver while the pedal 1 remains to be supported by the pedal bracket 4.

The backward movement of the pedal 1 rigidly secured by the pedal bracket 4 may cause the pedal 1 to hit legs of driver. Additionally, the movement may impose an impact load of a crash from a front side of the vehicle via the pedal bracket 4 on the legs of the driver who is operating the pedal 1.

SUMMARY OF THE INVENTION

It is a primary object of the present invention to provide a support structure of a pedal for protecting a driver. This improvement is realized by separating the pedal away from feet of driver in case of a car crash where a bulkhead and a toeboard panel intrude into a passenger compartment. The separation prevents the pedal from hitting the driver at the feet, and avoids imposing an impact load of the crash on the feet of driver.

To accomplish the above object, according to one aspect of the present invention, there is provided a support structure for a pedal having a pedal bracket which is connected to a toeboard panel for separating an engine compartment from a passenger compartment and to a steering beam disposed at a backward position than that of the toeboard panel. The pedal bracket comprises a front bracket section fixed to the toeboard panel, and a rear bracket section fixed to the steering beam through a support bracket for the steering beam, the pedal being attached with the rear bracket section. In such a configuration, a rear end part of the front bracket section is slidably secured to a front end part of the rear bracket section with coupling means.

According to a preferred embodiment of the present invention, the coupling means disengages the rear end part of the front bracket section and the front end part of the rear bracket section from each other when an impact load pushing backward the toeboard panel is applied to a vehicle.

According to another preferred embodiment of the present invention, the front bracket section has a top face which descends in a backward direction of the vehicle, and comprises a nail part continuous with the top face of the front bracket section and extending downwardly by a predetermined length from the rear end of the front bracket section.

According to another preferred embodiment of the present invention, the front end part of the rear bracket section slants along the rear end part of the front bracket section, and a rear end part of the rear bracket section is secured to the support bracket so as to facilitate an upward rotation at the front end part of the rear bracket section and a downward rotation at the rear end part thereof when applied an impact load not less than a predetermined one to the vehicle.

According to further preferred embodiment of the present invention, a pushrod for transmitting an operational force applied on the pedal is provided in the support structure, wherein the nail part bends the pushrod when the impact load pushing backward the toeboard panel is applied to the vehicle.

BRIEF DESCRIPTION OF DRAWINGS

These and other objects and advantages of the present invention will become understood from the following description with reference to the accompanying drawings, wherein.

DESCRIPTION OF THE PREFERRED EMBODIMENTS

Figure 1:
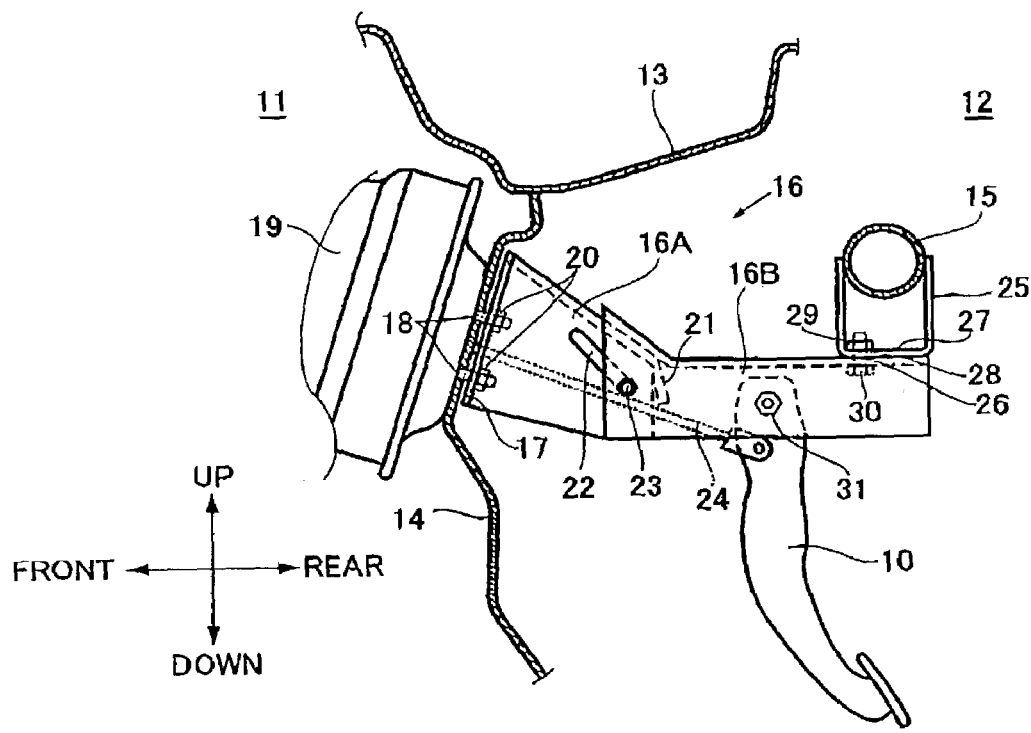
FIG. 1 shows a side view of an embodiment when the present invention is applied to a support structure for a brake pedal.

Preferred embodiments of the present invention, presently considered to be the best mode, is hereinafter described in detail with reference to FIG.1. FIG. 1 illustrates an example according to the embodiment when the present invention is applied to a support structure of a brake pedal.

As shown in FIG. 1, there are disposed a bulkhead 13 and a toeboard panel 14, as a partition wall for separating an engine compartment from a passenger compartment, in a recess below an instrument panel (not shown) where a brake pedal 10 is located. There is also disposed a steering beam 15 along a lateral direction of a vehicle body in the recess below the instrument panel. The steering beam 15, as a rigidly reinforced member, secures the instrument panel and supports steering components in order to avoid being displaced in case of a crash. The brake pedal 10 is supported by the vehicle body via a pedal bracket 16. The pedal bracket 16 is fixed to a toeboard panel 14 at a front end part of the pedal bracket 16, and to the steering beam 15 at a rear end part thereof.

The pedal bracket 16 is now described in detail.

The pedal bracket 16 is bilaterally symmetrical when mounted in the vehicle body. The pedal bracket 16 is a sheet metal member with a gutter-like cross section in the front view, and is open to the downward direction. The pedal bracket 16 has two pieces, a front bracket section 16A and a rear bracket section 16B. The front bracket section 16A is fixed to the toeboard panel 14 at the passenger compartment side of the toeboard panel 14. The rear bracket section 16B is provided below the steering beam 15, and fixed with the brake pedal 10. The front bracket section 16A is secured to the rear bracket section 16B, with a rear end part of the front bracket section 16A slidably inserted into a front end part of the rear bracket section 16B.

The front bracket section 16A has a contacting surface 17 integrally formed by bending thereof in the lateral direction (perpendicular to the surface of this document corresponding to the figure) at a front end part thereof. Bolt holes (not shown) with a predetermined diameter are formed in the contacting surface 17. The front bracket section 16A, the contacting surface 17 of which is in contact with the toeboard panel 14, is bolted to the toeboard panel 14 together with a brake Master vac 19 by nuts mating with respective mounting screws at the back of the brake Master vac 19.

The front bracket section 16A is formed such that the top face descends toward the rear when secured to a predetermined position on the toeboard panel 14. A nail part 21 continuous with the top face of the front bracket section 16A is integrally formed with the same front bracket section 16A. The nail part 21 descends from the rear end of the front bracket section 16A by a predetermined length. A pushrod 24 described below is disposed below the nail part 21.

Further, slits 22 are formed on laterally opposing sides of the front bracket section 16A. The slits 22 slant upwardly toward the front end, more steeply than that of the pushrod 24. It should be noted that only the left side slit is shown in the figure. The rear end of the slit 22 extends to a position where the rear end thereof overlaps with a front end part of the rear bracket section 16B, while a bolt 23 mounted in an inward direction at the front end part of the rear bracket section 16B is tightened with a nut, with the bolt 23 inserted into the slit so as to allow a slidable contact. Tightening torque of the nut is set to resist the pressure applied when a driver presses the pedal flat, while the torque is set to disengage the front and rear bracket sections 16A and 16B from each other when an impact load pushing the toeboard panel 14 backwardly is applied. Thus, the front bracket section 16A slides backwardly with remaining the condition inserted into the front end part of the rear bracket section 16B in case of a frontal crash pushing the toeboard panel 14 backwardly.

The slit 22 is formed at above the pushrod 24 which extends through the front bracket section 16A and connects the brake pedal 10 and the brake Master vac 19.

It should be noted that the slit 22 may be formed on the top face of the front bracket section 16A.

The rear bracket section 16B is formed in such a way that the front end part of the top face thereof slants upwardly along the rear part of the top face of the front bracket section 16A. In addition, the rear part of the top face of the rear bracket section 16B extends almost horizontally to a position corresponding to the rear end of the steering beam 15, and a bolt hole 26 is formed for fixing the rear bracket section 16B to a support bracket 25 of the steering beam 15. The support bracket 25 is firmly fixed to the steering beam 15 at both sides of the beam 15 at a location under the beam 15. A position of the bolt hole 26 is located under the steering beam 15 and in a forward position of the laterally extending axis of the steering beam 15.

On the other hand, a bottom contacting surface 27 of the support bracket 25 above the bolt hole 26 is provided with a similar bolt hole 28, while a welding nut is fixed at the bottom contacting surface 27. Thus, the rear end part of the rear bracket section 16B is fixed to the same support bracket 25 with a bolt 30 inserted into the bolt holes 26 and 28 and screwed into the welding nut 29. The top face of the rear end part contacts with the bottom contacting surface 27 of the support bracket 25. Because the bolt 30 is placed in a forward side of the axis of the steering beam 15, a load from the front equal to or above a predetermined one facilitates clockwise rotation in the figure with the bolt 30 as a center of rotation, while a counterclockwise rotation, i.e., a retreating displacement toward the passenger compartment is prevented.

A clevis pin 31 is provided across the laterally opposing sides of the rear bracket section 16B. The clevis pin 31 is inserted into a top end part of the brake pedal 10 so as to allow the brake pedal 10 to rotate. A rear end part of the pushrod 24 is swingably connected to a front part of the brake pedal 10, and a pedal stopper (not shown) is mounted on a rear part (the passenger compartment side) of the brake pedal 10. Thus, when the brake pedal 10 is pressed down, the brake pedal 10 is rotated around the clevis pin 31 in the clockwise direction, thereby pushing the pushrod 24 toward the brake master vac 19 to double the applied pressure. Then, the doubled pressure is converted into liquid pressure by a brake master cylinder (not shown), and the converted liquid pressure is fed to each wheel cylinder to press friction members such as a pad and a lining against a rotor or a drum.

As described above, according to the support structure for the pedal, the pedal bracket 16 supporting the brake pedal 10 is formed into two pieces, i.e., the front bracket section 16A fixed to the toeboard panel 14, and the rear bracket section 16B fixed below the steering beam 15 and provided with the brake pedal 10. Additionally, the bracket sections 16A and 16B are secured to each other with the bolt 23 in the slit 22 so that the front bracket section 16A can slide backwardly with the rear part thereof remaining the condition inserted into the front part of the rear bracket section 16B. The engagement force of the bolt 23 is set such that the load pushing the toeboard panel back can disengage the front and rear bracket sections 16A and 16B from each other.

Accordingly, in case of a frontal crash where the bulkhead 13 and the toeboard panel 14 intrude into the passenger compartment, the front bracket section 16A moves backward (toward the passenger compartment), remaining the rear part thereof inserted into the front part of the rear bracket section 16B, while the rearbracket section 16B does not move backwardly toward the passenger compartment because the rear end part of the rear bracket section 16B is connected and fixed to the steering beam 15. This feature allows an impact stroke without moving the rear bracket section 16B backwardly, and can absorb and reduce the load of the crash, thereby keeping the brake pedal 10 away from the feet of driver.

Further, the top face of the front bracket section 16A is formed so as to slant upwardly toward the front, and a nail part 21 extending toward the pushrod 24 is formed at the rear end of the front bracket section 16A. Additionally, the top face of the rear bracket section 16B is formed so as to slant along the top face of the front bracket section 16A at the front end part of the rear bracket section 16B. And, at the rear end part of the rear bracket section 16B, the clockwise rotation in the figure on the bolt 30 is facilitated, while the counterclockwise rotation therein is prevented. It should be noted that the bolt 30 is a pivot for connecting to the steering beam 15 via the support bracket 25.

Figure 2:
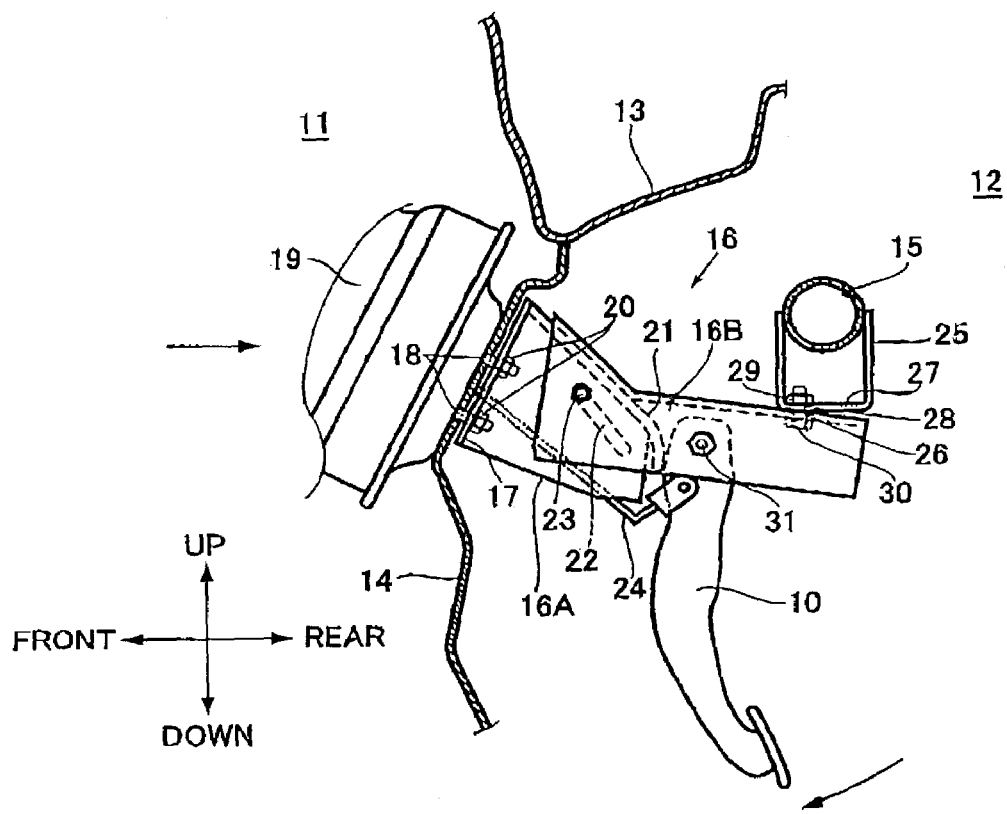
FIG. 2 shows the side view illustrating the support structure of a pedal bracket according to the same embodiment after a frontal crash.

Thus, as shown in FIG. 2, while the front bracket section 16A moves backwardly until the bolt 23 contacts with the front end of the slits 22, the nail part 21 is displaced downwardly to bend the pushrod 24. The bend of the pushrod 24 prevents the pushrod 24 from sticking, and avoids a direct application of the crashing load to the brake pedal 10. When the bolt 23 contacts with the front ends of the slits 22, the front bracket section 16A tends to descend into the rear bracket section 16B. But the rotation of the rear bracket section 16B toward the rear is firmly prevented, thereby generating a resistance. Then, the rear bracket section 16B is crashed around the pivot, rotating in the clockwise direction (the direction moving the brake pedal 10 away from the feet of driver). Thus, the crashing load is further absorbed and reduced.

Consequently, in a case where the driver is operating the pedal at the crash, the application of the crashing load to the feet of driver is avoided, and the backward movement of the pedal at the crash is reduced, thereby improving safety performance in case of the crash, without negative effect on operability of the pedal.

Figure 3:
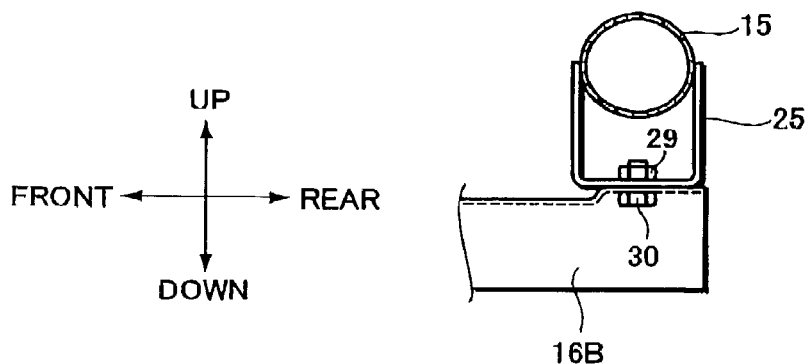
FIG. 3 illustrates the support structure for the pedal different from the above embodiment.
Figure 4:
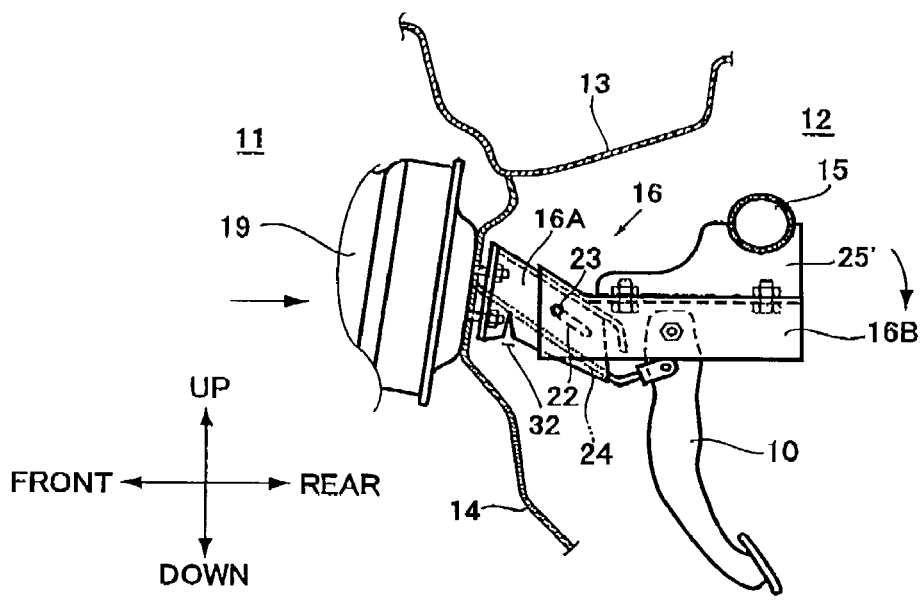
FIG. 4 illustrates the support structure for the pedal further different from the above embodiments.
Figure 5:
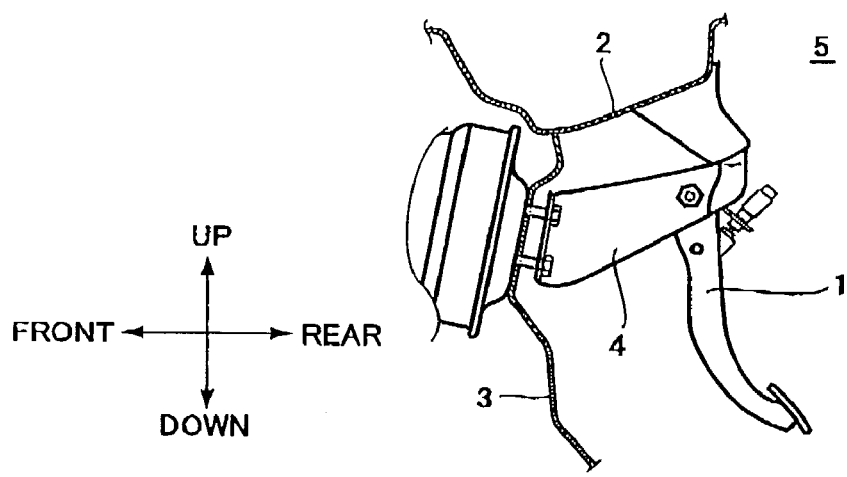
FIG. 5 illustrates a conventional support structure for the pedal.

It should be noted that shapes and forms of the pedal bracket 16 and the support bracket 25 are not restricted to those described above. As described in FIG. 3, the pedal bracket 16 and the support bracket 25 may be formed so as to fit into a shape of vehicle body, to facilitate the deformation in case of the crash such that the bolt 30 may be disposed beneath the axis of the steering beam 15 and the top face of the rear bracket section 16B may be raised at the rear of the bolt 30. This configuration can also prevent the rear bracket section 16B from moving toward the passenger compartment. Further, the further modifications may be made as shown in FIG. 4. That is, the front bracket section 16A maybe provided with a vertical notch 32, and also an enlarged support bracket 25' may be adopted.

Moreover, the present invention is not only applied to the aforementioned brake pedal 10, but also to the suspended type pedal such as an accelerator, a clutch, and a parking pedal.

As described above, the support structure for the pedal of the present invention separates the pedal away from the feet of driver in case of the crash where the bulkhead and the toeboard panel intrude into the passenger compartment. The separation prevents the pedal from hitting the driver at the feet, and avoids imposing the crashing load on the feet of driver. Consequently, the support structure for the pedal improving protection of a driver can be provided.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A support structure for supporting a pedal for a vehicle with a pedal bracket connected to a toeboard panel for separating an engine compartment from a passenger compartment and to a steering beam disposed at a backward position from the toeboard panel, comprising:
   a front bracket section of the pedal bracket fixed to the toeboard panel; and
   a rear bracket section of the pedal bracket fixed to the steering beam through a support bracket for the steering beam, said pedal being attached to said rear bracket section,
   wherein a rear end part of said front bracket section is slidably secured into a front end part of said rear bracket section with coupling means, and said coupling means disengages the rear end part of said front bracket section and the front end part of said rear bracket section from each other when an impact load pushing said toeboard panel backwardly is applied, and
   wherein said front bracket section with a top face descending in a backward direction of the vehicle comprises a nail part being continuous with the top face of said front bracket section and extending downwardly from the rear end of said front bracket section by a predetermined length.

2. The support structure according to claim 1, wherein said front end part of the rear bracket section slants along said rear end part of the front bracket section, and said rear end part is secured to said support bracket so as to facilitate an upward rotation at the front end part of said rear bracket section and a downward rotation at the rear end part thereof when an impact load from a front side of a vehicle is applied to the vehicle.

3. The support structure according to claim 1, further comprising:
   a pushrod for transmitting an operational force applied on said pedal,
   wherein said nail part bends said pushrod when the impact load pushing said toeboard panel backwardly is applied.

* * * * *